Feb. 9, 1943. H. BÄHRING ET AL 2,310,888
SYNCHRONIZED SAW TOOTH CURRENT GENERATOR
Filed March 20, 1941
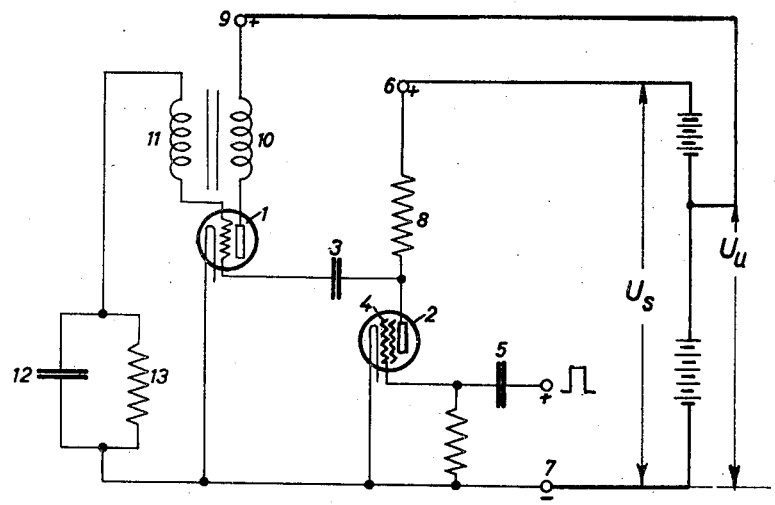
INVENTORS
HERBERT BÄHRING
THEODOR MULERT
BY
ATTORNEY Patented Feb. 9, 1943

2,310,888

UNITED STATES PATENT OFFICE

2,310,888

SYNCHRONIZED SAW-TOOTH CURRENT GENERATOR

Herbert Bähring, Klein-Machnow, and Theodor Mulert, Zehlendorf, Germany; vested in the Alien Property Custodian Application March 20, 1941, Serial No. 384,337
In Germany March 13, 1940

4 Claims. (Cl. 250—36)

The invention relates to saw tooth current generators including a transformer for coupling the anode circuit and the grid circuit of the generator tube. It refers particularly to generators of this type which are synchronized by impulses arriving in regular succession.

It is an object of the present invention to provide a saw tooth current generator which is easily synchronized by impulses of small amplitude and which produces a saw tooth current having a very short retrace period. It is a further object to provide a saw tooth current generator having a small number of tubes and requiring a small amount of energy for its operation. It is a further object to provide a saw tooth current generator for television and oscillograph purposes producing saw tooth currents having substantially linear ascending and descending portions.

If a saw tooth current generator shall be synchronized by impulses, the impulses must arrive before the self oscillating generator begins its back-stroke. Generators utilizing a transformer for inductively coupling the anode circuit and grid circuit of the generator tube have a small grid current at the moment of the beginning of the backstroke and this current must be prevented by the controlling impulses. The suppression of the grid current, however, produces a positive potential at the grid of the generator tube with the result that it counteracts the blocking of the tube. If the generator tube shall be completely blocked by the synchronizing impulse it is necessary to apply a higher negative potential to the grid in order to overcome the positive potential produced by the suppressed grid current. It is, therefore, necessary to make the negative synchronizing impulse much larger than the positive grid potential of the generator tube.

It has been suggested to arrange a synchronizing tube in such a manner that the anode of this tube is connected to the grid of the generator tube by way of a condenser and to apply positive synchronizing impulses to the control grid of the synchronizing tube. In this arrangement, however, it is difficult to produce synchronizing impulses of sufficient amplitude which can be applied to the grid of the generator tube by way of the synchronizing tube. The voltages of the source of potential for the synchronizing tube and for the discharge tube are usually of equal magnitude. In this case the synchronizing impulse applied to the grid of the generator tube is not of sufficient amplitude for blocking the generator tube immediately so that a correct synchronizing effect is not obtained.

According to the invention the charging potential of the coupling condenser connecting the anode of the synchronizing tube with the grid of the generator tube is made larger than the voltage of the source of potential connected to the terminals of the generator. The voltage applied to the terminals of the generator may differ from the anode voltage existing during the operation between anode and cathode of the generator tube. According to the invention the coupling condenser between the synchronizing tube and the discharge tube is charged during the slow stroke of the saw tooth current curve to a relatively high value. This value is higher than the voltage which is applied to the terminals of the generator. If now the synchronizing tube is opened by a positive impulse applied to the grid of this tube, the coupling condenser will be discharged by way of the synchronizing tube and the grid of the generator tube receives at this moment a high negative impulse of such amplitude that the generator tube is immediately blocked and an exact synchronization is effected. The potential to which the coupling condenser is charged during the slow stroke of the saw tooth current depends upon the time constant of the charging resistor and the capacity of the coupling condenser and increases with smaller time constants. In order to utilize the full potential produced at the condenser for blocking the generator tube the coupling condenser must be considerably larger than the grid cathode capacity of the generator tube. In this case the grid cathode capacity has practically no influence and the charge of the coupling condenser will not flow to an appreciable amount into the grid cathode capacity. The charging condenser must be discharged during the back-stroke period by way of the synchronizing tube and it is therefore necessary to make the time constant of the discharge small in comparison to the back-stroke period.

Other aspects of our invention will be apparent or will be specifically pointed out in the description forming a part of this specification, but we do not limit ourselves to the embodiment of the invention herein described, as various forms may be adopted within the scope of the claims.

Referring to the drawing the figure shows circuit arrangements according to the invention.

The figure shows an arrangement in which a generator tube 1 and a synchronizing tube 2 are connected by a condenser 3 arranged between the anode of the synchronizing tube and the control grid of the generator tube. The control grid of the synchronizing tube is connected by way of a condenser 5 to a source of positive synchronizing impulses. The anode of the synchronizing tube is connected by way of a resistor 8 to the positive pole 6 of a source of anode potential and the cathode of this tube to the negative pole 7 of this source of potential. According to the invention the voltage Us used for charging the coupling condenser 3 is larger than the voltage Uu applied between points 9 and 7 as anode potential of the generator tube 1. The generator tube 1 is connected to the anode coil 10 and grid coil 11 of a transformer. The grid circuit contains furthermore the parallel arrangement of a condenser 12 and a resistor 13 for producing the biasing potential for the generator tube.

The operation of this arrangement is as follows:

The synchronizing tube 2 is blocked during the long portion of the saw tooth current and is opened by a positive synchronizing impulse arriving by way of condenser 5. During the long portion the coupling condenser 3 is charged by the potential applied between points 6 and 7. If now the synchronizing tube 2 is opened by the positive impulse the condenser 3 is discharged by way of the synchronizing tube. In consequence of this discharge the grid of the generator tube 1 receives a strong negative impulse the amplitude of which is much larger than the positive potential produced by the decreasing of the grid current of the self oscillating generator. The grid of tube 1 receives therefore a negative potential so that the tube is blocked and an exactly synchronized saw tooth current is produced in this arrangement. In order to charge the condenser 3 to its full value it is necessary that the time constant of resistor 8 and condenser 3 is smaller than the long portion of the saw tooth current. It is however preferable to make this time constant larger than $\frac{1}{10}$ of this period.

According to the invention the synchronizing tube and the generator tube may be combined in a single envelope so that the anode of the generator tube acts as cathode for a synchronizing electrode system. It is preferable to use a screen grid system for the synchronizing section of the tube so that a reaction of the anode potential of the anode of the synchronizing system upon the oscillation of the generator tube is prevented.

In order to discharge the condenser between the synchronizing tube and the generator tube during the short period of the saw tooth current by way of the inner resistance of the synchronizing tube, the time constant of this discharge path must be small in comparison to the short period of the saw tooth oscillation.

It is preferable to make the voltage for charging the condenser at least 50% larger than the voltage applied to the terminals of the saw tooth current oscillator.

What we claim is:

1. A saw-tooth current generator comprising a generator tube and a synchronizing tube, a source of operating voltage for said generator tube, a condenser, a charging circuit for said condenser including means for applying thereto a higher voltage than said operating voltage, a discharging circuit for said condenser including said synchronizing tube and impedance means for developing a voltage pulse in accordance with the condenser discharge current, means for applying said voltage pulse to the control grid of said generator tube for synchronizing the operation thereof, and means for periodically rendering said synchronizing tube conducting in accordance with synchronizing pulses thereby periodically to discharge said condenser.

2. A saw-tooth current generator comprising a generator tube and a synchronizing tube, a source of operating voltage for said generator tube, a condenser connected between the anode of said synchronizing tube and the control grid of said generator tube, a charging circuit for said condenser including a source of higher voltage than said operating voltage, a discharging circuit for said condenser including said synchronizing tube, impedance means for developing a voltage pulse in accordance with the condenser discharge current, means for applying said voltage pulse to the control grid of said generator tube for synchronizing the operation thereof, and means for periodically rendering said synchronizing tube conducting in accordance with synchronizing pulses thereby periodically to discharge said condenser.

3. A saw-tooth current generator comprising a generator tube and a synchronizing tube, a source of operating voltage for said generator tube, a condenser connected between the anode of said synchronizing tube and the control grid of said generator tube, a charging circuit for said condenser including a source of operating voltage for said synchronizing tube, said last-named voltage being higher than said first-named voltage, a discharging circuit for said condenser including said synchronizing tube, impedance means for developing a voltage pulse in accordance with the condenser discharge current, means for applying said voltage pulse to the control grid of said generator tube for synchronizing the operation thereof, and means for periodically rendering said synchronizing tube conducting in accordance with synchronizing pulses thereby periodically to discharge said condenser.

4. A generator for generating saw-tooth current waves, having relatively long portions of gradual slope and relatively short portions of steep slope, comprising a generator tube and a synchronizing tube, a source of operating voltage for said generator tube, a condenser connected between the anode of said synchronizing tube and the control grid of said generator tube, a charging circuit for said condenser including a source of higher voltage, the time constant of said condenser and said charging circuit being greater than one tenth of the duration of one of said relatively long portions of said wave but smaller than the entire duration thereof, a discharging circuit for said condenser including said synchronizing tube, impedance means for developing a voltage pulse in accordance with the condenser discharge current, means for applying said voltage pulse to the control grid of said generator tube for synchronizing the operation thereof, and means for periodically rendering said synchronizing tube conducting in accordance with synchronizing pulses thereby periodically to discharge said condenser.

HERBERT BÄHRING.
THEODOR MULERT.